Aug. 21, 1951     S. KUCHINSKY     2,564,908
VOLTAGE SAMPLING AND ELECTRON BEAM HOLDING ARRANGEMENT
Filed March 8, 1949     2 Sheets-Sheet 2
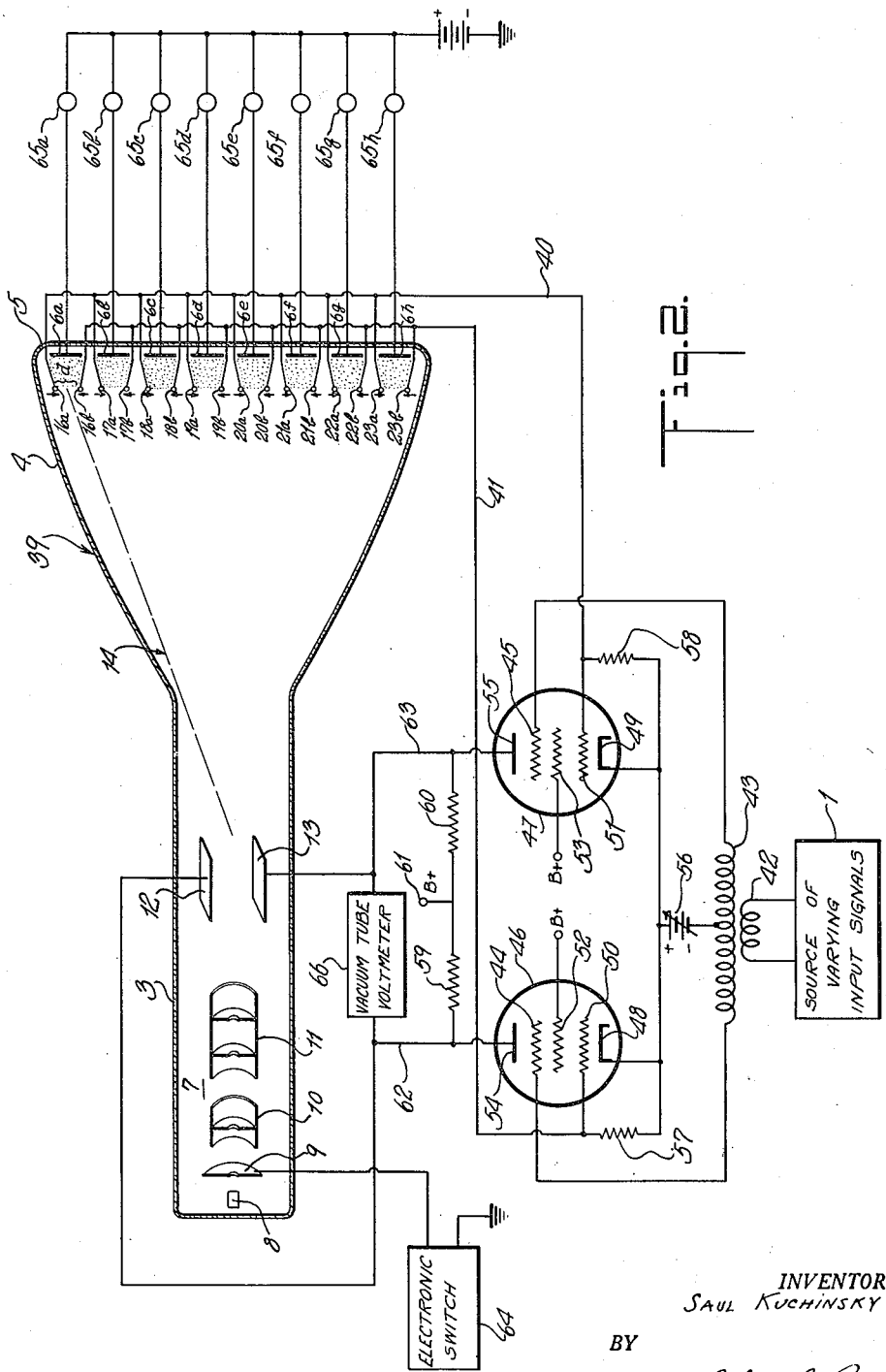
INVENTOR.
SAUL KUCHINSKY
BY
John J. Rogan
ATTORNEY Patented Aug. 21, 1951

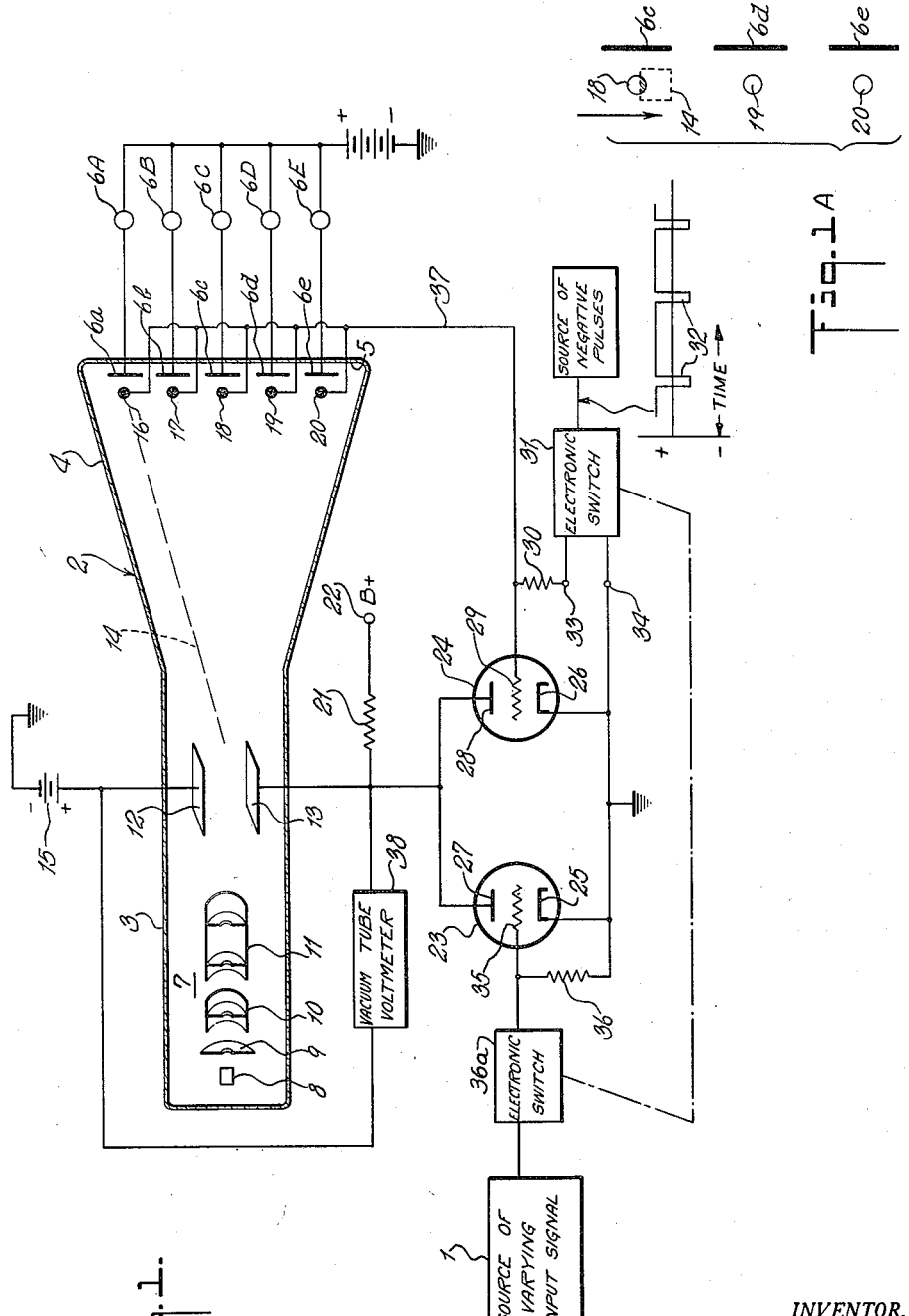

2,564,908

UNITED STATES PATENT OFFICE 2,564,908

VOLTAGE SAMPLING AND ELECTRON BEAM HOLDING ARRANGEMENT

Saul Kuchinsky, Clifton, N. J., assignor to National Union Radio Corporation, Orange, N. J., a corporation of Delaware Application March 8, 1949, Serial No. 80,694

4 Claims. (Cl. 250—27)

This invention relates to voltage sampling circuits and more particularly to arrangements for sampling a varying voltage at relatively high frequency rates.

A principal object of the invention relates to a voltage sampling arrangement employing a deflectable electron beam.

Another object relates to a voltage measuring system employing a deflectable electron beam, and a sampling circuit for measuring a varying voltage at any desired instant of its variation.

A further object relates to the combination of a cathode-ray tube and associated electron tube circuits for simultaneously measuring and producing a steady indication of any selected instantaneous value of a varying voltage.

A feature of the invention resides in the combination of a cathode-ray tube of the deflectable beam type having a plurality of spaced target electrodes each corresponding to a particular level of voltage to be indicated or measured; said electrodes acting as beam holding electrodes in conjunction with associated grid-controlled electron tubes.

Another feature relates to a voltage sampling arrangement of the deflectable electron beam type, having improved and simplified beam holding arrangements for holding the beam at a deflected position corresponding to the voltage being instantaneously sampled and independent of subsequent changes in that voltage.

A further feature relates to a voltage sampling system employing a deflectable electron beam, whereby a continuously varying input signal can be sampled instantaneously at discrete levels and at a predetermined rate and duration; and wherein the holding and sampling circuit can be isolated from the input circuit which supplies the voltage to be sampled.

Another feature relates to a voltage sampling system of the deflectable electron beam type, and wherein the signal being sampled does not have to be removed, or presampled, and wherein the holding of the beam at the sampling level is effective for unlimited durations notwithstanding a substantial level change in the level of the voltage being sampled.

A still further feature relates to the novel organization, arrangement and relative interconnection of parts, which cooperate to provide an improved and highly stable voltage sampling circuit for sampling extremely short durations of a continuously varying voltage.

Other features and advantages not particularly enumerated will be apparent after a consideration of the following detailed descriptions and the appended claims.

Fig. 1 is a schematic tube and wiring diagram of one embodiment of the invention.

Fig. 1A is an explanatory diagram relating to Fig. 1.

Fig. 2 is a schematic tube and wiring diagram of another and preferred embodiment of the invention.

Referring to Fig. 1, the block 1 represents diagrammatically, any well-known source of continuously varying electric voltage whose level at any desired instant of time is to be measured or sampled, and with the measurement indication to persist regardless of the shortness of the sampling instant. As one illustration for producing this measuring indication, there is shown in Fig. 1 a cathode-ray beam tube 2 of any well-known construction having the usual evacuated glass envelope with the neck portion 3, and the enlarged funnel-shaped portion 4 which is closed by the usual end wall or viewing portion 5. The interior surface of the wall 5 may be provided with a coating of any well-known material which produces a visual indication in response to an impinging electron beam. If desired however, a series of anodes 6a—6e are mounted adjacent the wall 5 and each connected to a respective signal indicating device or arrangement such for example as small neon tubes 6A—6B etc. or the like.

Suitably mounted within neck 3 is an electron gun 7 for developing a beam of electrons which can be focussed to a spot of the desired size adjacent the electrodes 6a—6e. This gun may comprise the usual electron-emitting cathode 8, the spot or beam intensity control electrode 9, first beam focussing and accelerating anode 10, and the second or higher voltage beam accelerating and focussing anode 11. Mounted between the electron gun and the electrodes 6a—6e is a pair of electrostatic deflector plates 12, 13, whose relative D. C. potentials determine the position of the electron beam 14 with respect to the electrodes 6a—6e. The plate 12 is positively biassed with respect to ground by a suitable battery 15 or other source of steady D. C. so as normally, that is in the absence of input signals, to bias the beam so that it impinges on the first electrode 16 of a series of beam holding electrodes 16—20. The plate 13 is, in accordance with one feature of the invention, arranged to have its D. C. potential with respect to ground, controlled by the varying input signal to be sampled and also by the relative position of the electron beam 14 with respect to the beam holding electrodes 16—20, there being one holding electrode for each of the electrodes 6a—6e. While the drawing shows five such beam holding electrodes and five electrodes 6a—6e, it will be understood that a greater or less number can be used depending upon the fineness of the desired measurement or sampling. The size of the beam cross sections where it intercepts the electrodes 16—20 is not critical so long as in passing across each electrode 16—20, its intercept therewith increases from zero, then to a maximum and finally again to zero.

The plate 13 is connected through a suitable load resistor 21 to the positive terminal 22 of a suitable D. C. power supply which may be the same as that supplying the operating potentials to the electrodes 10, 11. The ground return for resistor 21 is controlled by two separate paths, one including the grid-controlled amplifier tube 23, and the other including the grid-controlled amplifier tube 24. The cathodes 25, 26, are connected directly to ground, and the plates or output anodes 27, 28, are connected directly to deflector plate 13 and also to one end of load resistor 21. It will be seen therefore that the resistance 21 in conjunction with the parallel plate-to-cathode resistances of tubes 23, 24, forms a voltage divider, so that the actual potential of deflector plate 13 with respect to plate 12, can be determined by the plate-to-cathode currents of tubes 23, 24.

The control grid 29 is returned to ground through a bias resistor 30 in series with a suitable pulse generator 31 which generates negative square topped pulses 32. In other words, when generator 31 is in operation, it applies a negative pulse 32 preferably of square top wave shape to the grid 29. This generator may consist of a switch, which when sampling is taking place, connects the points 33, 34, directly together, but when no sampling is to take place it applies the negative pulse across the points 33, 34, making point 33 negative with respect to point 34. This generator may be of any well-known type which generates a succession of equal magnitude square top pulses at predetermined time spacings. It will be clear therefore that the rate of repetition of these negative pulses and the pulse width will determine respectively the instants of time at which sampling of the input voltage is to take place. The input voltage to be sampled is applied to grid 35 which is returned to the cathode 25 through resistor 36. The holding electrodes 16—20 are all connected in parallel by conductor 37 and thence to the control grid 29. The negative square waves or pulses 32 are generated at such a magnitude that when the generator is in operation they bias tube 24 to plate current cutoff, whereas the grid 35 is biassed by the varying input signals from source 1 flowing through resistor 36. The plate current through tube 23 corresponding to the input signal, produces a voltage drop across resistor 21 which determines the voltage at deflector plate 13. Thus the potential of plate 13 determines the amount of angular deflection of the beam 14 and in the absence of negative pulses from the generator 31 the tube 24 holds the beam at its deflected position. For increasing values of input signal to grid 35, the beam moves correspondingly away from the initial or zero level or holding electrode 16 and its associated anode 6a.

When the beam impinges upon any holding electrode while sampling is not taking place, the beam current flows over conductor 37 and thence through resistor 30 and the generator 31 to ground. However, because of the negative pulse from generator 31, tube 24 remains at plate current cutoff thus allowing the input voltage to control the beam. When the beam is between two adjacent holding electrodes no bias by the beam current is set up across resistor 30. As the beam approaches and starts to overlap a holding electrode the current to resistor 30 first increases from zero to a maximum and then drops to a minimum as it is leaving the holding electrode.

When it is desired to sample the voltage from source 1, that is, hold the beam at an instantaneous sampling point, the negative pulse from square wave generator 31 is removed so that when the beam strikes a holding electrode the grid 29 is effectively biassed by the beam current picked up by the appropriate holding electrode and flowing to ground through resistor 30. The operation of the system will be described for three different conditions of the input signal at the time of sampling. First when it is increasing in a direction so as to increase the negative bias on grid 35; second when it is decreasing so as to reduce the negative bias on grid 35; and finally when it is varying, that is increasing and decreasing at a rapid rate during the sampling period.

In the first condition, the increase of the signal drives the grid 35 towards plate current cutoff thus producing a voltage rise at deflector plate 13. If at the instant of sampling as a result of turning off the negative pulses from generator 31, the beam 14 happens to be moving between two adjacent holding electrodes, for example from 18 to 19 as represented in Fig. 1A, there will not be produced any negative bias on grid 29 and tube 24 will draw maximum plate current, with the result that the voltage at deflector plate 13 will drop, thereby reversing the direction of the beam movement and causing it to move back to electrode 18, to the point where the holding electrode draws just enough current from the beam to bias grid 29 by means of the voltage drop through resistor 30 so that the plate current of tube 24 is just sufficient to drop the voltage of plate 13 and the beam stays put at electrode 18. It should be observed that the stable holding position of the beam on any given holding electrode is such that the beam intercepts or overlaps only a portion of the electrode, for example the "lower" portion of the electrode as indicated in Fig. 1A by the shaded area of electrode 18. It will be understood of course that the term "lower" is used in a purely relative sense, it being assumed that the tube is shown in Fig. 1 with the holding electrodes arranged in a vertical superposed array, and the beam 14 is deflected vertically. It will be understood of course, that this showing is essentially schematic and the various targets 6a—6e and the corresponding holding electrodes 16—20 may be arranged in any other desired array. Since it has been assumed that at the instant of sampling the input voltage is increasing, this would tend to cause the beam to move downwardly in the direction of the arrow thus tending to reduce the overlap between the beam and the holding electrode 18. The result is that a smaller current flows through resistor 30 and a greater plate current is drawn by tube 24. The net result is therefore, that the beam moves back to its stable holding intercept with the electrode 18. In other words, as the input signal on grid 35 continues to increase in bias after the sampling takes place, the plate current of tube 23 decreases, which tends to raise the potential of plate 13 and also tending to cause the beam to leave electrode 18 and move towards electrode 19, but this is offset by the inverse action as regards the bias on grid 29 which causes the plate current of tube 24 to increase as stated above. This increase is brought about by reason of the fact that as the beam starts to leave electrode 18, it reduces its overlap with that electrode. Thus, electrode 18 starts to draw less current from the beam. By drawing less current, the negative bias at grid 29 is likewise reduced and the plate current of tube 24 correspondingly increases and correspondingly lowers the potential of plate 13. This causes the beam to move back to the electrode 18 until the beam current picked up by that electrode biasses the grid 29 sufficiently to maintain the potential of plate 13 at such a stable value that the beam remains held at its stable intercept with electrode 19 where the beam was located at the instant sampling took place. In other words, if subsequent to the actual instant of sampling, the input signal is increasing, it has no effect on the proper holding position of the beam which corresponds to the input voltage at the instant of sampling. It will be seen therefore, that tube 24 has the ability to hold the beam in its sampling position against a steep rise of input signal from source 1. That is, tube 24 can saturate the common plate load resistor 21 by reason of the tendency of the beam to move downwardly off a holding electrode, just as fast as the steep rise of the input signal can "unsaturate" the said resistor under control of tube 23.

In the second condition, where the input signal is decreasing at the time of sampling, the grid 35 drives tube 23 towards plate current saturation thus tending to produce a voltage decrease at plate 13. If at the instant of sampling, the beam happens to be between adjacent electrodes, for example 18, 19, then there will be no bias across resistor 30 and the tube 24 draws sufficient plate current to lower the potential of plate 13 as above described, and the beam moves back towards electrode 18. The beam continues across resistor 18 whereupon the current picked up at that electrode from the beam rises from zero to maximum and overbiasses grid 29. By this feedback action, the voltage of plate 13 assumes a stable value at which the beam is held on the electrode 18 which is the electrode it intercepted at the instant when the sampling took place. However, since the input signal bias on grid 35 is under these conditions decreasing, the tube 23 may cause the potential of plate 13 to decrease further and may tend to move the beam in the same reversed direction, until a stable potential at plate 13 is arrived at. For this latter reason therefore, the frequency at which the sampling takes place at switch 31 should preferably be high with respect to the signal input frequency; or the duration of the sampling interval, that is the width of the pulse 32, should be small compared with the rate of decrease of the signal being sampled.

In the third condition where the input signal is continuously varying, that is, increasing and decreasing, the sampling is effected by having the sweep input signal from source 1 removed from grid 35 in fixed timed relation to the operation of switch 31 so that the input signal is ineffective to change the potential of plate 13 at the instant that the holding feedback circuit controlled over conductor 37 and grid 29 becomes effective. For this purpose a switch 36a may be connected in circuit with grid 35 and source 1 and this switch may be ganged to the operating element or control device of switch 31. In order to produce a direct indication of the magnitude of the sampled voltage, a vacuum tube voltmeter 38 or the like can be connected directly across the plates 12 and 13. Likewise, if desired, each of the anodes 6a—6b etc. may be connected in circuit with an individual indicator device such for example as small neon tubes 38a, 38b, etc. to produce a visual indication of the held position of the beam 14.

Fig. 2 shows a preferred modification of the invention. In general, the tube 39 can be constructed the same as the tube 2 of Fig. 1 and the elements of both tubes which are the same are designated alike. In tube 39 however, each anode 6a, 6b, 6c, etc. is provided with a pair of holding electrodes 16a—16b, 17a—17b, etc. The holding electrodes of each pair are spaced from each other a distance "d" approximately equal the width of the associated anode. All the corresponding holding electrodes 16a—17a—18a, etc. are connected in parallel and to a common conductor 40. Likewise, all the corresponding holding electrodes 16b—17b—18b, etc. are connected in parallel and to the common conductor 41.

The source 1 of the signal waves whose level or voltage is to be sampled at any desired instant or instants of time, is coupled to the primary winding of a suitable transformer 42 whose secondary 43 is connected for push-pull action to the grids 44, 45, of a pair of plural grid electron tubes 46, 47. These tubes are preferably of like characteristics and while they are shown as having separate enclosing evacuated envelopes, they may be mounted within the same evacuated envelope. Preferably, they are of the triple grid or pentode type such for example as Radio Manufacturers Association type NU1133D, or W. E. 6AS6. Each tube has an electron-emitting cathode 48, 49; a first control grid 50, 51; shield grids 52, 53; second control grids 44, 45; and output anodes or plates 54, 55. The bias on grid 44 with respect to its cathode 48 and likewise the bias of grid 45 with respect to its cathode 49, are controlled by a suitable adjustable D. C. biassing source 56. The first control grids 50 and 51 are biassed by means of the respective resistors 57 and 58 through which the currents from the respective holding electrodes 16a, 17a, etc. and 16b, 17b, etc. flow when the beam impinges thereon. The shield grids 52, 53, can be connected to some suitable positive D. C. terminal on the D. C. power supply in the well-known manner. The plates or output anodes 54 and 55 are supplied with the usual steady positive direct current voltage in push-pull relation through equal resistors 59, 60, from the positive D. C. power supply terminal 61. Likewise, plates 54 and 55 are connected by conductors 62, 63, to the respective deflector plates 12, 13. The tubes 46, 47, are designed in conjunction with the remaining elements of the system so that when the grids 50 and 51 are energized by the holding currents from the beam 14 and flowing conductors 40 and 41, they take control of the plate currents of the respective tubes 46, 47, in the sense that their control over the plate current is very much greater than the control of the plate current of their respective tubes by the input signal potentials applied to respective grids 44, 45.

In the system of Fig. 2, instead of maintaining the beam continuously "on," it is arranged to be pulsed on at the required sampling instants by means of a suitable switch 64 which controls a beam blanking potential applied to the control grid 9 of the electron gun. In other words, the beam 14 is not developed in the tube 39 except when suitable potential pulses are applied to grid 9 when sampling of the input voltage from source 1 is to take place. Thus, when sampling is not taking place, the potential of plate 12 with respect to plate 13, is controlled entirely by the input signal from source 1. When sampling is to take place, the beam is pulsed "on" and is deflected across the holding electrodes to an extent determined by the magnitude of the input signal at the instant of sampling. At the same instant, the holding circuits become effective to maintain the beam on the appropriate holding electrode and the corresponding anode. In other words, the beam is held in its deflected position corresponding to the instantaneous magnitude of the input signal from source 1 and independently of whether the said signal is increasing or decreasing before or after the instant of sampling.

When no sampling is taking place, the beam 14 is blanked off and therefore none of the holding electrodes receives current and consequently neither of the grids 50, 51, receives any bias. Thus, the varying input signal applied to grids 44, 45, correspondingly varies the relative potentials across the deflector plates 12 and 13.

When sampling is to take place, the switch 64 operates to switch the beam 14 on. This beam by impinging on a particular holding electrode for example electrode 17a, as determined by the level of the input signal from source 1 at the instant of sampling, biasses the corresponding grid 51. If the beam happens to be on the holding electrode 17b at the instant of sampling, it likewise biasses the grid 50. The effect of this is to change the relative potentials across plates 12, 13, to deflect the beam in the direction of the arrow adjacent the corresponding holding electrode. Thus, if at the instant of sampling, the input signal is such as to deflect the beam to anode 6b and so that it is intercepted by electrode 17a, this holding electrode 17a collects sufficient current from the beam so as to bias the grid 51 to cause the tube 47 to drop in plate current, which is equivalent to making plate 13 more positive with respect to plate 12. This causes the beam to move from the holding electrode 17a towards holding electrode 17b. As the beam reduces its intercept with electrode 17a and increases its intercept with electrode 17b, the bias on grid 51 drops and the bias on grid 50 increases, thus causing plate 12 to become more positive with respect to plate 13 and causing the beam to reverse its deflection. Eventually therefore, the beam returns to holding electrode 17a and by reason of its intercept therewith, it produces a sufficient current to bias the grid 51 and thereby maintain the potential across plates 12 and 13 at a stable value. By this arrangement, the beam is held at the appropriate anode, for example anode 6b, since the region represented by the shaded area between electrodes 17a and 17b is a stable holding region for the beam. In other words, at the instant of sampling, the beam is effectively held in the region between the appropriate pair of holding electrodes and cannot migrate beyond the region represented by the shaded area between these electrodes.

The result of the foregoing arrangement is that if during the sampling interval the input signal varies in either direction, these variations are effectively cancelled out since the beam is subjected to negligible deflecting movement in the stable region between the appropriate pair of holding electrodes, which maintains a stable feedback potential across the plates 12 and 13 as a result of the grids 50 and 51 taking control of the plate currents of their respective tubes.

With this arrangement therefore, the sampling is substantially independent of the frequency of the input signal or its rate of variation, and a higher frequency of sampling is possible with a greater amount of stability and less critical operation of the system. Furthermore, the sampling interval can be maintained for an unlimited duration against a maximum input signal change subsequent to the instant of sampling.

If desired, the anode 6a, 6b, etc. can be coated with suitable phosphor material which fluoresces when impinged upon by the electron beam and if desired each of the anodes can be connected in circuit with an individual indicator such as a neon tube 65a, 65b, etc. so as to give a visual indication of the position of the beam at the time it is being held by the holding circuits described. If desired, a suitable measuring instrument such as a vacuum tube voltmeter 66 can be connected across conductor 62 and 63 to give a direct indication of the actual voltage across the plates 12, 13, at the instant of sampling.

While one particular embodiment has been described herein, various changes and modifications may be made therein without departing from the spirit and scope of the invention.

What is claimed is:

1. Apparatus for sampling a varying level voltage during predetermined spaced time intervals, comprising, a cathode-ray tube having means to develop a deflectable electron beam only at said intervals, a pair of beam deflector plates, a plurality of pairs of beam holding electrodes there being one such pair for each deflected position of the beam, an electron tube having an electron-emitting cathode, an anode and a pair of control grids, means connecting the anode of said electron tube to one of said deflector plates, means connecting the first control grid of said electron tube to like holding electrodes in said pairs, means to apply the varying level voltage to the second control grid of said electron tube said holding electrodes when intercepted by said beam controlling the plate current of said electron tube and the potential at said deflector plate substantially independent of the varying level voltage applied to said second control grid when the electron beam is developed.

2. Apparatus for sampling a varying level voltage during predetermined spaced time intervals, comprising, a cathode-ray tube having an electron gun to develop a deflectable electron beam only at said intervals, a pair of beam deflector plates, a plurality of pairs of beam holding electrodes there being one such pair for each deflected position of said beam, a pair of plural control grid electron tubes said tubes having their anodes connected in push-pull relation across said deflector plates, means connecting all the like holding electrodes of said pairs in parallel to the first control grid of one electron tube, means connecting the remaining like holding electrodes of said pairs to the first control grid of the other electron tube, means to apply the varying level voltages in push-pull relation to the second control grids of said electron tubes, and means to pulse the electron beam on during said time intervals only.

3. Apparatus for sampling a varying level signal at predetermined time intervals, comprising, a cathode-ray tube having an electron gun for developing a deflectable electron beam, means to pulse said gun on at said intervals only, a pair of beam deflector plates, a plurality of pairs of beam holding electrodes there being one such pair for each deflected beam position, means including a grid-controlled electron tube to apply to said deflector plates a voltage corresponding to said varying signal, means also including said electron tube to derive from the beam current as intercepted by said holding electrodes another voltage for application to said deflector plates, and means responsive to the pulsing on of said gun to render said grid-controlled electron tube effective to control the voltage at said deflector plates substantially entirely by said holding currents.

4. Apparatus according to claim 3, in which said electron tube has first and second control grids the first control grid being biased by the beam holding current intercepted by said holding electrodes and the second control grid being excited by the varying level signals to be sampled, the first control grid when biased by said holding current taking control of the plate current of said tube substantially independently of the second control grid.

SAUL KUCHINSKY.

REFERENCES CITED

The following references are of record in the file of this patent:

UNITED STATES PATENTS

| Number | Name | Date |
|---|---|---|
| 2,153,638 | Norman | Apr. 11, 1939 |
| 2,171,216 | Koch | Aug. 29, 1939 |
| 2,224,677 | Hanscom | Dec. 10, 1940 |
| 2,278,641 | Bond | Apr. 7, 1942 |
| 2,395,299 | Skellett | Feb. 19, 1946 |
| 2,407,505 | Michael | Sept. 10, 1946 |
| 2,418,521 | Morton et al. | Apr. 8, 1947 |
| 2,477,008 | Rosen | July 26, 1949 |
| 2,482,544 | Jacobsen | Sept. 20, 1949 |